(No Model.) 2 Sheets—Sheet 1.
H. W. CHURCH.
WOOL WASHING MACHINE.
No. 410,312. Patented Sept. 3, 1889.
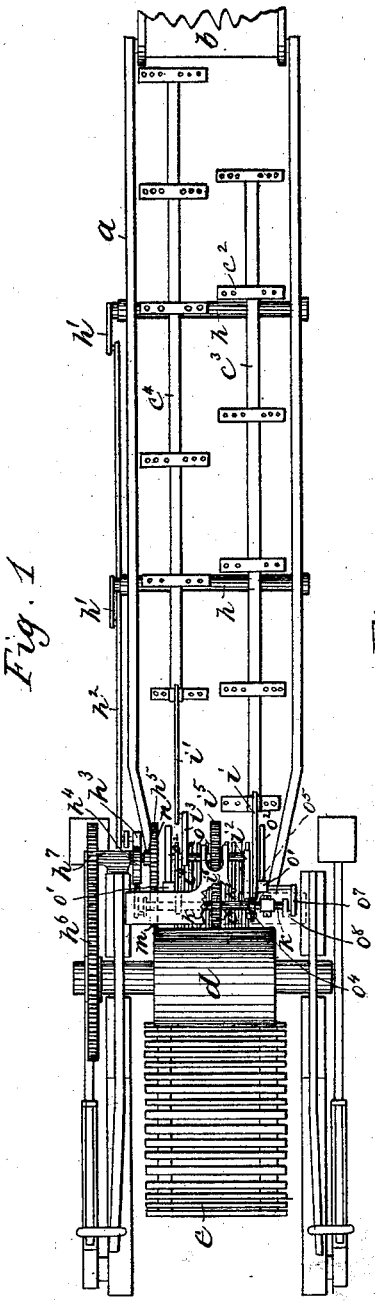
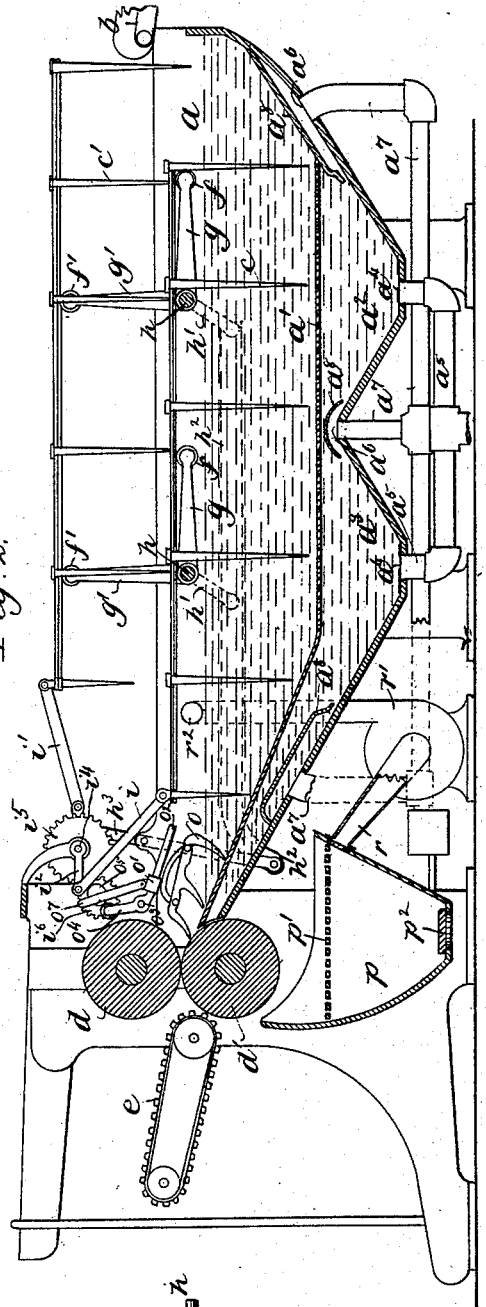
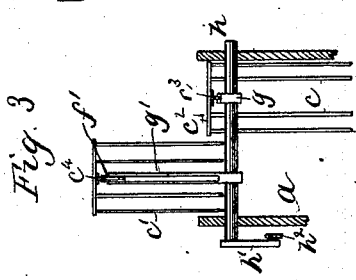
Witnesses.
Jas. J. Maloney
M. E. Hill
Inventor.
Henry W. Church
by Jos. P. Livermore
Att'y.

(No Model.) 2 Sheets—Sheet 2.
H. W. CHURCH.
WOOL WASHING MACHINE.
No. 410,312. Patented Sept. 3, 1889.
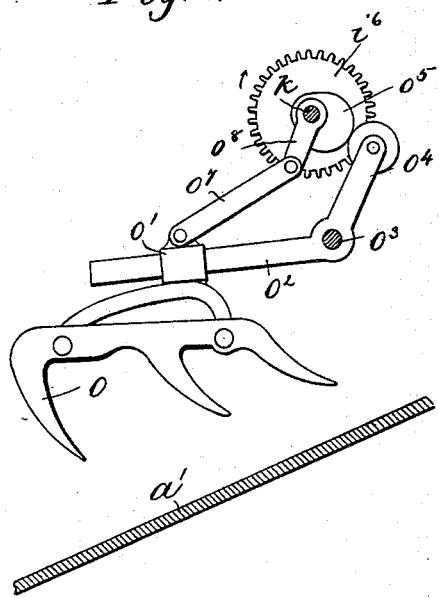
Witnesses,
Jas. F. Maloney.
M. E. Hill.
Inventor,
Henry W. Church
by Jos. P. Livermore
Att'y.

United States Patent Office.

HENRY WARD CHURCH, OF GRANITEVILLE, MASSACHUSETTS.

WOOL-WASHING MACHINE.

SPECIFICATION forming part of Letters Patent No. 410,312, dated September 3, 1889.

Application filed December 6, 1886. Serial No. 220,801. (No model.)

*To all whom it may concern:*

Be it known that I, HENRY WARD CHURCH, of Graniteville, county of Middlesex, State of Massachusetts, have invented an Improvement in Wool-Washing Machines, of which the following description, in connection with the accompanying drawings, is a specification, like letters on the drawings representing like parts.

My invention relates to a machine for washing wool or similar material, of that class in which the material to be washed is agitated in a bowl or reservoir containing the washing-liquid.

In Patent No. 339,379, dated April 6, 1886, I have shown and described a wool-washing machine in which the wool is agitated by two sets of forks or rakes, one at either side of the middle of the bowl, that move backward and forward alternately in the bowl to agitate the wool therein.

The present invention is embodied in an apparatus also having two sets of forks or rakes similarly arranged in the bowl; and the invention consists partly in novel appliances for actuating the rakes.

The invention also consists in a novel construction of the bowl by which the operation of cleaning it is facilitated; also in a novel construction of the delivering-rake or device for removing the washed material from the bowl and presenting it to the squeezing-rolls; also in a novel construction and arrangement of the receptacle that receives the liquid pressed out from the washed wool and returns it to the washing-bowl.

Figure 1 is a plan view of a wool-washing machine embodying this invention, parts of the frame being broken away to show the parts beneath; Fig. 2, a longitudinal section thereof; Fig. 3, a detail showing the main rakes or agitators, to be referred to; and Fig. 4, a detail showing the delivering-rakes and their actuating mechanism in side elevation on a larger scale.

The general arrangement and mode of operation of the apparatus are similar to those of the apparatus shown in the patent before referred to, the wool or material to be washed being fed gradually into one end of the bowl $a$ by a feeding-apron $b$, and being agitated in the said bowl by agitating devices (shown as connected sets of rakes $c\ c'$) and drawn out from the other end of the bowl into the bite of squeezing-rollers $d\ d'$, which press the greater part of the liquid out from the washed wool and deliver the latter on the apron $e$, that conducts the washed material away from the squeezing-rollers.

The bowl $a$ is provided with the usual perforated false bottom $a'$, above which the wool remains, and through which the dirt washed from the wool settles, so as to collect in the space below this false bottom. The bottom of the bowl $a$, below the false bottom $a'$, is provided with one or more depressions $a^2\ a^3$, having at their lowest part outlet-openings $a^4$, which may communicate with a pipe $a^5$, through which the liquid containing the dirt and sediment may be discharged. At either side of the depressions $a^2\ a^3$ the bottom of the bowl rises upward, and at or near the top of the upward incline is provided with inlet-openings $a^6$, which may communicate with inlet-pipes $a^7$, by means of which water or other fluid may be forced into the bowl. Above the said inlet-openings the bowl is provided with deflectors $a^8$, which direct the stream of fluid forced into the pipes $a^7$ down along the bottom of the receptacle toward the depressions $a^2\ a^3$ and outlet-openings $a^4$ therefrom, so as to effectually remove the sediment and dirt that collect below the false bottom $a'$.

The agitating devices $c\ c'$ consist of sets of teeth arranged in cross-bars like the teeth of a rake, there being several sets of these teeth supported on slide-bars $c^3\ c^4$, which may be made of U or T iron, as shown in Fig. 3, and rest on suitably-shaped rollers $f\ f'$ at the end of arms $g\ g'$, fixed on rock-shafts $h$, that extend across the bowl from side to side. The arms $g\ g'$ are arranged between the teeth of the rakes, so that they do not interfere with the longitudinal movement of the rake bars or frames $c^3\ c^4$ on the rollers $f\ f'$, as will be understood from Fig. 3, and the longitudinal movement is somewhat less than the distance between two adjacent rakes, so that the latter can make their complete forward and backward stroke without interfering with the rock-shafts $h$, the agitating devices being shown in Fig. 1 as at their extreme positions. By turning the rock-shaft $h$ quarter round in the direction indicated by the arrow, Fig. 2, the arms $g$ will be raised to the vertical position, and the arms $g'$ lowered to the horizontal position, thus raising the agitating devices $c$ out of the bowl and lowering the agitating devices $c'$ into the bowl, and this movement of the rock-shafts takes place simultaneously with the longitudinal movement of the agitating devices, so that the latter have a compound movement, rising and falling at the same time that they move lengthwise in the bowl. Their forward movement toward the delivery end of the bowl takes place mainly while they are lowered, and the return movement takes place mainly while they are raised out from the bowl, so that there is a general tendency to carry the wool along from the receiving toward the delivery end of the bowl, while subjecting it to more or less of a backward and forward and rolling movement in its progress.

The rock-shafts $h$ are shown as provided with crank-arms $h'$ outside the bowl, connected by a link $h^2$ with a lever $h^3$, actuated by a cam $h^4$ on a shaft $h^5$, actuated by gearing $h^6$ $h^7$ from the shaft of one of the squeezing-rollers, which is driven by any suitable actuating power. Thus at each rotation of the shaft $h^5$ the rock-shafts $h$ are caused to oscillate through a quarter-turn, and thus raise one set of agitating devices and at the same time lower the other set at the other side of the bowl.

The agitating devices $c^3$ $c^4$ are connected by links $i$ $i'$ with cranks $i^2$ $i^3$ on a shaft $i^4$, supported in suitable bearings between the said cranks, the said cranks being provided with a gear $i^5$, meshing with a pinion $i^6$ on a shaft $k$, provided with a pinion $m$, meshing with a gear $n$ on the shaft $h^5$. The pinions $i^6$ and $m$ are of the same size, and the gears $i^5$ and $n$ are of the same size, or these gears are otherwise so proportioned that the shaft $i^4$ has the same speed of rotation as the shaft $h^5$, so that the agitating devices will make a complete to-and-fro movement due to the action of the crank $i^2$ $i^3$ in the same time that they will make a complete rising and falling movement due to the oscillation of the rock-shafts $h$.

The washed material, after having been carried forward through the bowl and thoroughly agitated in its passage, is drawn out from the bowl and delivered to the squeezing-rolls $d$ $d'$ by a delivering-rake $o$, which has a forward and backward and rising and falling movement, being raised as it moves backward from the rollers toward the bowl, so as not to push the material back, and being dropped as it moves forward from the bowl toward the rolls, so as to engage and carry the material up into the rollers. The bowl contracts toward the feeding-rollers, and the rake $o$ is consequently narrower than the width of the main part of the bowl.

The rake $o$ is actuated from the shaft $k$, and the gearing $m$ $n$, that drives the shaft, is so proportioned that the shaft $k$ makes two rotations to each single rotation of the shafts $h^5$ $i^4$, so that the delivering-rake $o$ makes a complete backward and forward movement in the time occupied by a movement of one of the agitating devices in one direction only.

The rake $o$ is provided with guides $o'$, traveling on guide-rods $o^2$, that project from a rock-shaft $o^3$, provided with arms $o^4$, actuated by cams $o^5$ on the shaft $k$, which thus produces a rising and falling movement of the guides $o^2$, on which the rake $o$ travels. The said rake is moved longitudinally on these guide-rods $o^2$ toward and from the rollers $d$ $d'$ by means of links $o^7$, connected with the guides $o'$ and with cranks $o^8$ on the shaft $k$, which thus moves the rake down the guide-rods $o^2$, while the latter are raised by the cams $o^5$, and then move the rake up the guide-rods $o^2$ toward the rollers $d$ $d'$, when the said rod is permitted to drop by the action of the cams $o^5$.

The liquid squeezed out from the wool by the feed-rollers instead of being returned directly to the bowl by a circulating-pump, as heretofore practiced in machines of this class, falls into a settling-basin $p$, provided with a screen $p'$ at its top, which will catch any fibrous material that may fall with the liquid, and the liquid is drawn from the basin $p$ by a pipe $r$ from a point near the top of the said basin and returned by a pump $r'$ and pipe $r^2$ to the bowl $a$. By thus taking the liquid from the upper part of the basin $p$ an opportunity is afforded for the sediment in said liquid to settle, and said settling-basin $p$ is provided with a discharge-opening $p^2$, through which the sediment may be discharged when a sufficient amount is collected to render this operation desirable.

I claim—

1. The combination, with the bowl, of the two sets of agitating-forks connected with longitudinal frame-pieces, rock-shafts, and supporting-arms for said longitudinal frame-pieces, a crank and pitman for operating the said longitudinal frame-pieces, and the actuating-cam and connections for oscillating said rock-shafts, the delivering-rakes, and oscillating guides therefor, and an actuating-shaft for said delivering-rakes and guide, and gearing connecting said shaft with the crank-shaft that actuates the main fork proportioned to give the delivering-rake actuating-shaft double the rotary speed of the main fork-actuating shaft, substantially as described.

2. In a wool-washing machine, the bowl provided with a false bottom, and having depressions in the space below said false bottom and discharge-passages from said depressions, and inlet-passages through the elevated part of the bottom at the side of said depressions and deflectors over the mouths of said inlet-openings, substantially as described.

3. The combination, with the bowl, of the two agitating devices operating side by side in said bowl, the rock-shafts and supporting-arms for said agitating devices, and actuating mechanism for said rock-shafts and agitating devices, whereby the former are oscillated and the latter are simultaneously reciprocated on said supporting-arms, substantially as described.

4. The combination of the delivering-rake with an oscillating guide upon which said rake is longitudinally movable, a rotating shaft provided with a cam that oscillates the said guide, and with a crank connected with said rake for producing its reciprocating movement on said guide, substantially as described.

5. In a wool-washing machine, a bowl and squeezing-rollers, through which the washed material is delivered, combined with a settling-basin into which the liquid removed from said rollers is received, said basin being provided with a screen near its top and an outlet-passage near the top of said settling-basin, and pump connected therewith having a delivery-pipe entering the main bowl near the top thereof, substantially as described.

In testimony whereof I have signed my name to this specification in the presence of two subscribing witnesses.

HENRY WARD CHURCH.

Witnesses:
JOS. P. LIVERMORE,
M. E. HILL.